United States Patent
Gremetz et al.

(10) Patent No.: US 10,183,269 B2
(45) Date of Patent: Jan. 22, 2019

(54) CONTINUOUS FLOW REACTOR WITH TUNABLE HEAT TRANSFER CAPABILITY

(71) Applicant: CORNING INCORPORATED, Corning, NY (US)

(72) Inventors: Sylvain Maxime F Gremetz, Montereau Fault Yonne (FR); Elena Daniela Lavric, Avon (FR); Olivier Lobet, Villiers sous Grez (FR)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/580,949

(22) PCT Filed: Jun. 10, 2016

(86) PCT No.: PCT/US2016/036867
§ 371 (c)(1),
(2) Date: Dec. 8, 2017

(87) PCT Pub. No.: WO2016/201211
PCT Pub. Date: Dec. 15, 2016

(65) Prior Publication Data
US 2018/0311641 A1    Nov. 1, 2018

Related U.S. Application Data

(60) Provisional application No. 62/173,932, filed on Jun. 10, 2015, provisional application No. 62/174,943, filed on Jun. 12, 2015.

(51) Int. Cl.
*B01J 19/24* (2006.01)
*B01J 19/00* (2006.01)
(Continued)

(52) U.S. Cl.
CPC ......... *B01J 19/249* (2013.01); *B01J 19/0093* (2013.01); *F28F 3/08* (2013.01);
(Continued)

(58) Field of Classification Search
CPC .................. B01J 19/249; B01J 19/0093; B01J 2219/0081; B01J 2219/00819;
(Continued)

(56) References Cited

U.S. PATENT DOCUMENTS 4,828,580 A    5/1989    Dach
5,193,911 A    3/1993    Nix et al.
(Continued)

FOREIGN PATENT DOCUMENTS

CH         685476 A5      7/1995
CN         202101593 U    1/2012
(Continued)

OTHER PUBLICATIONS

Hessel et al; "Chemical Micro Process Engineering", Angew. Chem. Int. Ed., 2006, 45, 7321-7322.
(Continued)

*Primary Examiner* — Lessanework Seifu
(74) *Attorney, Agent, or Firm* — Gregory V. Bean

(57) ABSTRACT

A flow reactor fluidic module (12) includes a reactant fluid module (20) having an internal process fluid passage (22) and a first major planar outer surface (24a) and a thermal resistance R between the internal process fluid passage (22) and the first major planar surface (24); a thermal control fluid module (30) having an internal thermal control fluid passage (32) and a second major planar outer surface (34a); a holding structure (50) holding the reactant fluid module (20) and the thermal control fluid module (30); and a gap (25) separating the first major planar surface (24a) from the second major planar surface (34a). The gap (25) comprises
(Continued)

an interchangeable or replaceable substance or sheet (26) having a thermal resistance G across the gap (25), wherein G is not equal to R.

14 Claims, 1 Drawing Sheet

(51) Int. Cl.
 *F28F 3/08* (2006.01)
 *F28F 27/00* (2006.01)
(52) U.S. Cl.
 CPC ....... *F28F 27/00* (2013.01); *B01J 2219/0081* (2013.01); *B01J 2219/00824* (2013.01); *B01J 2219/00831* (2013.01); *B01J 2219/00867* (2013.01); *B01J 2219/00873* (2013.01); *B01J 2219/00876* (2013.01); *B01J 2219/2462* (2013.01); *B01J 2219/2487* (2013.01); *B01J 2219/2488* (2013.01)
(58) Field of Classification Search
 CPC .... B01J 2219/00876; B01J 2219/00823; B01J 2219/00824; B01J 2219/00826; B01J 2219/00828; B01J 2219/00831; B01J 2219/2461; B01J 2219/2462; B01J 2219/2483; B01J 2219/2485; B01J 2219/2487; B01J 2219/2488
 See application file for complete search history.

(56) References Cited

U.S. PATENT DOCUMENTS

| | | | |
|---|---|---|---|
| 5,355,382 | A | 10/1994 | Kovacs et al. |
| 5,408,510 | A | 4/1995 | Ball et al. |
| 5,515,316 | A | 5/1996 | Yamamoto et al. |
| 5,690,763 | A | 11/1997 | Ashmead et al. |
| 6,116,002 | A | 9/2000 | Woodward |
| 6,241,467 | B1 | 6/2001 | Zelesky et al. |
| 6,390,963 | B1 | 5/2002 | Lauderbaugh |
| 6,548,027 | B1 | 4/2003 | Hall et al. |
| 6,618,418 | B2 | 9/2003 | Northrup et al. |
| 7,163,052 | B2 | 1/2007 | Taras et al. |
| 7,357,908 | B2 | 4/2008 | Ramani et al. |
| 7,714,315 | B2 | 5/2010 | Happ et al. |
| 8,049,198 | B2 | 11/2011 | Chang |
| 8,076,663 | B2 | 12/2011 | Liu |
| 8,783,279 | B2 | 7/2014 | Williams, Jr. et al. |
| 9,278,332 | B2 | 3/2016 | Hoglund et al. |
| 2006/0051260 | A1 | 3/2006 | Yagi et al. |
| 2007/0039721 | A1 | 2/2007 | Murray |
| 2009/0087359 | A1* | 4/2009 | Roberge ............... B01J 19/0093 422/200 |
| 2009/0223648 | A1 | 9/2009 | Martin |
| 2010/0081577 | A1 | 4/2010 | Sidhu et al. |
| 2010/0139631 | A1 | 6/2010 | Geskes et al. |
| 2012/0138269 | A1 | 6/2012 | Holahan et al. |
| 2013/0287884 | A1 | 10/2013 | Jenko et al. |
| 2014/0251578 | A1 | 9/2014 | Hindi |
| 2015/0136359 | A1 | 5/2015 | Ku |
| 2015/0327405 | A1 | 11/2015 | Niizuma |

FOREIGN PATENT DOCUMENTS

| | | |
|---|---|---|
| DE | 102012221161 A1 | 5/2014 |
| EP | 1734324 A2 | 12/2006 |
| FR | 2951153 A1 | 4/2011 |
| JP | 2010204364 A | 9/2010 |
| WO | 2014042800 A1 | 3/2014 |
| WO | 2016201221 A1 | 12/2016 |

OTHER PUBLICATIONS

International Search Report and Written Opinion of the International Searching Authority; PCT/US2016/036867; dated Sep. 1, 2016; 12 Pages; European Patent Office.

Ke et al; "Single Step Cell Lysis/PCR Detection of *Escherichia coli* in an Independently Controllable Silicon Mircoreactor"; Sensors and Actuators B, 120 (2007) 538-544 .

Kim et al; "A Disposable, Self-Contained PCR Chip"; Lab Chip, 2009, 9(4): 606-612.

Muller et al; "Fast Preparation and Testing Methods Using a Microstructured Modular Reactor for Parallel Gas Phase Catalyst Screening", Catalysis Today, 81 (2003) 377-391.

Muller, "A Modular Approach to Heterogeneous Catalyst Screening in the Laminar Flow Regime", vol. 799 DE Fortschritt-Berichte VDI: Reihe 3, Verfahrenstechnik, Verein Deutscher Ingenieure, VDI-Verlag, 2004, ISBN 3183799030, 9783183799039.

Zou et al; "Micro-Assembled Multi-Chamber Thermal Cycler for Low-Cost Reaction Ship Thermal Multiplexing", Sensors and Actuators A 102 (2002) 114-121.

* cited by examiner

CONTINUOUS FLOW REACTOR WITH TUNABLE HEAT TRANSFER CAPABILITY

CROSS-REFERENCE TO RELATED APPLICATIONS

This application claims the benefit of priority under 35 U.S.C. § 371 of International Patent Application Serial No. PCT/US2016/036867, filed on Jun. 10, 2016, which in turn, claims the benefit of priority under 35 U.S.C. § 119 of U.S. of Provisional Application Ser. No. 62/173,932, filed on Jun. 10, 2015, the content of which is relied upon and incorporated herein by reference in its entirety, and of Provisional Application Ser. No. 62/174,943 filed on Jun. 12, 2015, the content of which is relied upon and incorporated herein by reference in its entirety.

BACKGROUND

The world operates currently through continuous depletion of basic utilities such as energy and freshwater, and sees an ever-increasing cost of raw materials. Thus, it has become increasingly important to improve the sustainability and efficiency of processes of fine chemical and pharmaceutical synthesis. One solution, which enables fewer reagents, less waste materials, high throughput, more efficiency, increased safety and reduced environmental impact, is represented by the use of continuous, small-dimension flow reactors. The use of such continuous-flow devices avoids the drawbacks associated to either conventional "batch" synthesis or scale-up when moving from laboratory to market-size production.

Continuous flow micro-/milli-reactors (reactors having working fluid passage cross-sectional dimensions in the micro- to several milli-meter range) have demonstrated the ability to increase process efficiency due to the intensification of heat and mass transfer processes. The effects on the chemical reactions are beneficial, enabling the reactions to be operated in desirable windows of temperature(s) and concentration(s), thus decreasing the generation of by-products. Furthermore, due to the small in-process volume of continuous flow reactors and their higher controllability, relative to batch reactors, the hazards associated with dangerous chemical processes are considerably reduced.

Despite these advantages, scale up to sufficient production rates can be difficult for some reactions due in part to the large quantities desired. Operating many reactors in parallel—and/or many flow paths in parallel in a single reactor—is one solution. Another is to increase the passage size and the resulting throughput per passage. These two approaches may be combined.

When developing a new reaction process for implementation in a flow reactor, it is desirable and often necessary to work at a small scale initially before transferring the reaction developed at small scales to a higher throughput reactor. In the case of a higher throughput reactor with larger passages, partial heat transfer coefficients (and so total heat transfer coefficients related to the heat transfer area) are reduced, on the one hand, and specific heat transfer areas are reduced, on the other. These two factors lead to a significant decrease of the volumetric heat transfer coefficient. As a consequence, during the scale-up from smaller to bigger passages, the heat transfer performance, expressed by the volumetric heat transfer coefficient, is significantly affected and therefore, a chemical process will perform differently, according to scale.

Corning AFR™ flow reactor modules overcome this problem by the use of glass, with relatively low thermal conductivity, as a module material in the two smallest modules of the AFR line, having small passages and flow rates of from only milligrams per minute up to around 200 grams per minute, and silicon carbide, with much higher thermal conductivity, as a module material in the largest modules having large passages and flow rates of up to a few kilograms per minute. The result is that the thermal performance of a small lab-scale reactor is sufficiently similar to the thermal performance of a larger production reactor that many chemical processes, once developed and optimized at lab scales, can be successfully performed in a production reactor without modification. It would be desirable to extend this scale-up capability to an increased range of reactor sizes and materials, and the widest possible range of reactants or process fluids.

SUMMARY

According to embodiments of the present disclosure, a flow reactor fluidic module is provided comprising a reactant fluid module having an internal process fluid passage and an outer surface, the outer surface comprising a first major planar surface. The reactant fluid module also has, at a portion thereof positioned between the internal process fluid passage and the first major planar surface, a thermal resistance R. The fluidic module further comprises a first thermal control fluid module comprising an internal thermal control fluid passage and an outer surface, with the outer surface comprising a second major planar surface. The fluidic module further comprises a holding structure holding the reactant fluid module and the thermal control fluid module and a gap separating the first major planar surface from the second major planar surface. The gap comprises an interchangeable or replaceable substance or sheet, and the interchangeable or replaceable substance or sheet having a thermal resistance G across the gap, wherein G is not equal to R, and depends on the actual substance or sheet in the gap. The gap can have a non-uniform width, and where gap width is used herein the average gap width is considered. The first and second major planar surfaces can even be in contact at some locations.

According to embodiments of the fluidic module, G is greater than R, greater than 1.1·R, greater than 1.2·R, greater than 1.5·R, greater than 1.8·R, and/or even greater than 2·R.

According to additional embodiments, the ratio of G to R is in the range of from 0.4 to 1250, within the range of from 1 to 800, or even within the range of from 1.1 to 100.

According to embodiments, G is in the range of from $2.5 \cdot 10^{-6}$ to 0.05 m²·K/W, or even in the range of $2.5 \cdot 10^{-4}$ to 0.01 m²·K/W.

According to embodiments, the gap has an average gap width in the range of from 1 µm to 1 mm, or even in the range of 10 µm to 0.2 mm.

According to embodiments, the reactant fluid module comprises first and second plates sealed together enclosing the internal process fluid passage and the gap is physically accessible to allow the interchangeable or replaceable substance or sheet to be interchanged or replaced without disassembly of the reactant fluid module.

According to embodiments, the gap is adjustable.

According to embodiments the interchangeable or replaceable substance or sheet comprises a thermal grease.

According to embodiments the interchangeable or replaceable substance or sheet comprises a sheet and a thermal grease.

According to embodiments the interchangeable or replaceable substance or sheet consists of air.

According to embodiments the interchangeable or replaceable substance or sheet comprises one or more of a polymer, a metal sheet, a phase change material, a gas, a solid, a liquid, and a multiphase material.

According to embodiments the interchangeable or replaceable substance or sheet comprises a filled polymer.

According to embodiments the outer surface of the reactant fluid module comprises a third major planar surface and the fluidic module further comprises both 1) a second thermal control fluid module comprising an internal thermal control fluid passage and an outer surface, the outer surface comprising a fourth major planar surface, and 2) a second gap between the third planar surface and the fourth planar surface.

According to still more embodiments a flow reactor comprises two or more modules according to any of the above embodiments, the two or more modules fluidically connected to each other.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
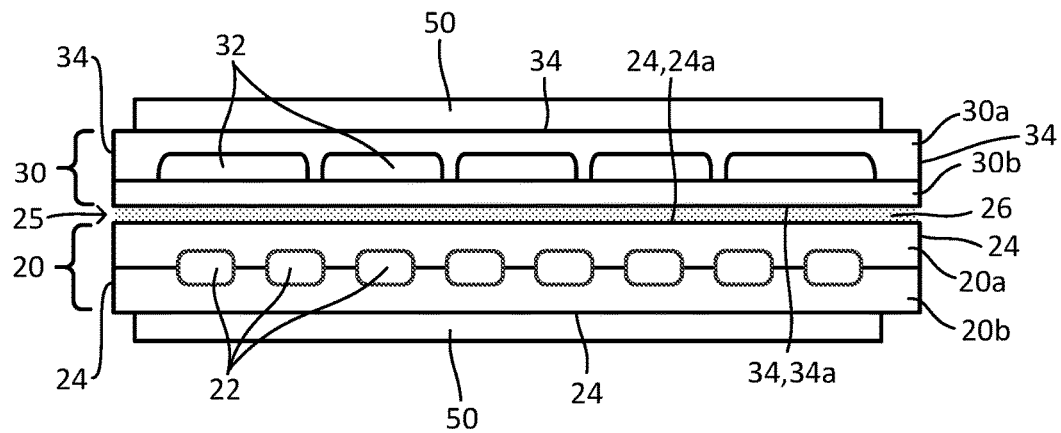
FIG. 1 is a cross-sectional view of a fluidic module for a flow reactor according to embodiments of the present disclosure.

In the drawings, relative size, position and dimension are for illustration only and not to scale. "Plate" as defined herein refers to either structure as in a plate-like structure or plate-like half of a larger monolithic structure regardless of the fabrication history of the structure, as well as to plate-like structure which forms, by assembly, with temporary or permanent attachment, a part of a larger structure.

FIG. 1 is a cross-sectional view of a fluidic module for a flow reactor according to embodiments of the present disclosure. With reference to FIG. 1, a flow reactor fluidic module (12) comprises a reactant fluid module (20) having an internal process fluid passage (22) and an outer surface (24), the outer surface comprising a first major planar surface (24a). (In this document, planar is term meaning generally planar, up to and including surface deviation of as great as 2 mm from flat.) The reactant fluid module (20) has, at a portion thereof positioned between the internal process fluid passage (22) and the first major planar surface (24a), a thermal resistance R.

The value of R is determined by R=$\delta$/k, where $\delta$ is the average thickness of a first plate (20a) or a first half (20a) of the reactant fluid module 20, and k the thermal conductivity of the same plate or half (20a).

The fluidic module (12) further comprises a first thermal control fluid module (30) comprising an internal thermal control fluid passage (32) and an outer surface (34), the outer surface comprising a second major planar surface (34a); a holding structure (50) holding the reactant fluid module (20) and the thermal control fluid module (30); and a gap (25) separating the first major planar surface from the second major planar surface. The gap (25) comprises an interchangeable or replaceable substance or sheet (26). The interchangeable or replaceable substance or sheet (26) in the gap has a thermal resistance G across the gap (25), and G is not equal to R, or, alternatively, the interchangeable or replaceable substance or sheet is consists of a material or materials different from a material materials which the reactant fluid module (20) comprises.

The value of G is determined by G=$\delta$/k, where $\delta$ is the average thickness of the material (26) in the gap (25) and k is the thermal conductivity of the material (26).

Desirably, G is greater than R, greater than 1.1·R, greater than 1.2·R, greater than 1.5·R, greater than 1.8·R, and/or even greater than 2·R. The ratio of G to R desirably is in the range of from 0.4 to 1250, within the range of from 1 to 800, or even within the range of from 1.1 to 100, and G itself is desirably in the range of from $2.5 \cdot 10^{-6}$ to 0.05 m$^2$·K/W, or even in the range of form $2.5 \cdot 10^{-4}$ to 0.01 m$^2$·K/W. These desirable conditions are desirable in certain situations, not required.

The gap (25) has an average gap width, and the average gap width is in the range of from 1 μm to 1 mm, or even in the range of in the range of from 10 μm to 0.2 mm.

The reactant fluid module (20) comprises first and second plates (20a,20b) sealed together enclosing the internal process fluid passage (22). In some embodiments, the first and second plates (20a,20b) are permanently sealed together. Similarly to the reactant fluid module (20), thermal control fluid module (30) comprises first and second plates (30a, 30b) sealed together enclosing the internal thermal control fluid passage (32). In some embodiments, the first and second plates (30a,30b) of the thermal control fluid module (30) are not permanently sealed together. Because the reactant fluid module (20) is sealed and encloses the internal process fluid passage (22), the gap (25) is accessible to allow the interchangeable or replaceable substance or sheet (26) to be interchanged or replaced without disassembly of the reactant fluid module (20). Because the thermal control fluid module (30) is sealed and encloses the internal thermal control fluid passage (32), the gap (25) is accessible to allow the interchangeable or replaceable substance or sheet (26) to be interchanged or replaced without disassembly of the thermal control fluid module (30).

According to embodiments, the width of the gap may be adjustable, such as by changing the relative mounted positions of the reactant fluid module (20) and the thermal control fluid module (30). According to embodiments, such adjustment may also be achieved by inserting an interchangeable or replaceable substance or sheet (26) having a different thickness than the immediately prior interchangeable or replaceable substance or sheet, particularly if the holding structure is designed to press the modules (20,20 together. Alternatively, the gap (25) may be of constant size, but various materials may be placed in the gap to change the value of G.

The interchangeable or replaceable substance or sheet (26) can comprise a sheet and a thermal grease, one or more of one or more of a polymer, a metal sheet, a ceramic sheet, a glass sheet, a phase change material, a gas, a solid, a liquid, and a multiphase material, or a filled polymer. The interchangeable or replaceable substance or sheet (26) can simply consist of air.

Figure 2:
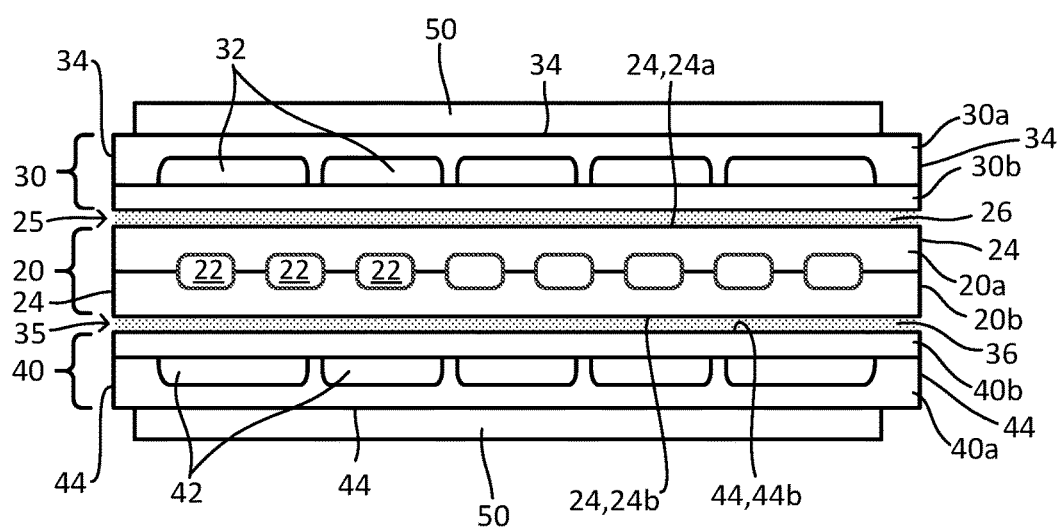
FIG. 2 is a cross-sectional view of another fluidic module for a flow reactor according to embodiments of the present disclosure.

FIG. 2 is a also cross-sectional view of a fluidic module for a flow reactor according to embodiments of the present disclosure. With reference to FIG. 2, according to embodiments such as that shown in FIG. 2, the reactant fluid module comprises a third major planar surface (24b) and the fluidic module (12) further comprises both 1) a second thermal control fluid module (40) comprising an internal thermal control fluid passage (42) and an outer surface (44) comprising a fourth major planar surface (44a) and 2) a second gap (35) between the third planar surface (24b) and the fourth planar surface (44a). The dual-side configuration of the embodiment of FIG. 2 maximizes the heat transfer performance of the module and better simulates conditions in dual-side production size flow reactor modules.

Figure 3:
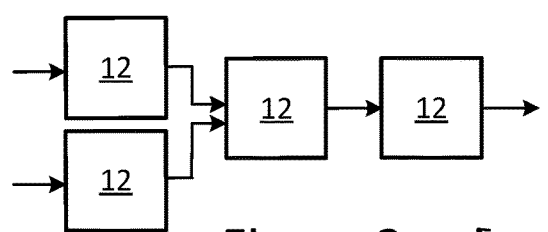
FIG. 3 is a diagram of a flow reactor comprising two or more fluidic modules according to embodiments of the present disclosure.

FIG. 3 is a diagram of a flow reactor comprising two or more fluidic modules according to embodiments of the present disclosure. In FIG. 3, a flow reactor (10) comprises two or more modules (12) of the type disclosed herein. Using modules (12) in reactor (10) allows reactor (10), even if small in scale, to closely match the thermal performance of larger production-size flow reactors of various sizes by increasing G sufficiently to make the volumetric heat transfer coefficient within module (12) fall within 5, 10, or 20% of the value of the calculated (or measured) volumetric heat transfer coefficient in a larger size reactor intended for production.

Desirably, both the first and second plates (20a,20b) of the reactant fluid module (20) and the first and second plates (30a,30b) of the first thermal control fluid module (30) (as well as the plates (40a,40b) of the second thermal control fluid module (40), if present) are formed of a high thermal conductivity material. This provides the widest range of adjustability in the thermal performance of the module (12). The plate material desirably has a thermal conductivity of at least 15 W/m·K at 20° C., at least 20 W/m·K at 20° C., at least 30 W/m·K at 20° C., or even at least 60 W/m·K at 20° C. or greater.

Desirably, the first and second plates (20a,20b) of which the reactant fluid module (20) is formed, comprise or even consist of silicon carbide. This allows the module (12) to resist the broadest range of chemical environments, including high temperature strongly basic environments which will easily dissolve most glass. The ability provided by the present disclosure to adjust G and make G greater than R is even more important in this instance because otherwise the high thermal conductivity of silicon carbide makes the reaction environment in a small scale reactor, in particular the thermal performance of the small scale reactor, much too high relative to the performance of a large scale reactor. Without the ability to increase G, thermally sensitive reaction process designed and optimized in a small scale SiC flow reactor will not scale directly and simply to a large scale SiC flow reactor. Merely reducing flow rate of thermal fluids and/or reactant fluids does not work. With the ability to increase (or reduce) G selectively, quickly, easily, and inexpensively, independent of flow rates, as provided by the embodiments of the present disclosure, a single small laboratory or pre-production SiC reactor can match the various levels of thermal performance of reactors of various materials and various sizes, as needed.

The methods and/or devices disclosed herein are generally useful in performing any process that involves mixing, separation, extraction, absorption, distillation, crystallization, precipitation, or otherwise processing fluids or mixtures of fluids, including multiphase mixtures of fluids—and including fluids or mixtures of fluids including multiphase mixtures of fluids that also contain solids—within a microstructure. The processing may include a physical process, a chemical reaction defined as a process that results in the interconversion of organic, inorganic, or both organic and inorganic species, a biochemical process, or any other form of processing. The following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices: polymerisation; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydroformylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

What is claimed is:
1. A flow reactor fluidic module (12) comprising:
a reactant fluid module (20) having an internal process fluid passage (22) and an outer surface (24) comprising a first major planar surface (24a), the reactant fluid module (20) having, at a portion thereof positioned between the internal process fluid passage (22) and the first major planar surface (24a), a thermal resistance R;
a first thermal control fluid module (30) comprising an internal thermal control fluid passage (32) and an outer surface (34) comprising a second major planar surface (34a);
a holding structure (50) holding the reactant fluid module (20) and the thermal control fluid module (30); and
a gap (25) separating the first major planar surface from the second major planar surface, the gap (25) comprising an interchangeable or replaceable substance or sheet (26), the interchangeable or replaceable substance or sheet (26) having a thermal resistance G across the gap (25), wherein G is not equal to R.

2. The fluidic module (12) according to claim 1, wherein G is greater than R.

3. The fluidic module (12) according to claim 2, wherein G is greater than 1.1·R.

4. The fluidic module (12) according to claim 1, the ratio of G to R is in the range of from 0.4 to 1250.

5. The fluidic module (12) according to claim 1, wherein G is in the range of from $2.5 \cdot 10^{-5}$ to $0.05$ m$^2$·K/W.

6. The fluidic module (12) according to claim 1, wherein the gap (25) has an average gap width, the average gap width being in the range of from 1 μm to 1 mm.

7. The fluidic module according to claim 1, wherein the reactant fluid module (20) comprises first and second plates (20a,20b) sealed together enclosing the internal process fluid passage (22) and wherein the gap (25) is accessible to allow the interchangeable or replaceable substance or sheet (26) to be interchanged or replaced without disassembly of the reactant fluid module.

8. The fluidic module according to claim 7 wherein the gap (25) is adjustable.

9. The fluidic module according to claim 7 wherein the interchangeable or replaceable substance or sheet (26) comprises a sheet and a thermal grease.

10. The fluidic module according to claim 7 wherein the interchangeable or replaceable substance or sheet (26) consists of air.

11. The fluidic module according to claim 7 wherein the interchangeable or replaceable substance or sheet (26) comprises one or more of a polymer, a metal sheet, a phase change material, a gas, a solid, a liquid, and a multiphase material.

12. The fluidic module according to claim 7 wherein the interchangeable or replaceable substance or sheet (26) comprises a filled polymer.

13. The fluidic module (12) according to claim 7 wherein the outer surface (24) of the reactant fluid module comprises a third major planar surface (24b) and wherein the fluidic module (12) further comprises both (1) a second thermal control fluid module (40) comprising an internal thermal control fluid passage (42) and an outer surface (44) comprising a fourth major planar surface (44a) and (2) a second gap (35) between the third planar surface (24b) and the fourth planar surface (44a).

14. A flow reactor (10) comprising two or more modules according to claim 1, the two or more modules fluidically connected to each other.

\* \* \* \* \*

UNITED STATES PATENT AND TRADEMARK OFFICE
CERTIFICATE OF CORRECTION

PATENT NO. : 10,183,269 B2
APPLICATION NO. : 15/580949
DATED : January 22, 2019
INVENTOR(S) : Sylvain Maxime F Gremetz et al.

Page 1 of 1

It is certified that error appears in the above-identified patent and that said Letters Patent is hereby corrected as shown below:

On the Title Page

Page 2, Column 2, item (56), other publications, Line 5, delete "Mircoreactor";" and insert -- Microreactor"; --, therefor.

Signed and Sealed this
Twenty-seventh Day of August, 2019

Andrei Iancu
*Director of the United States Patent and Trademark Office*